US010718665B2

(12) United States Patent
Edwards et al.

(10) Patent No.: US 10,718,665 B2
(45) Date of Patent: Jul. 21, 2020

(54) SELF-REFERENCING MOBILE-COMPATIBLE SPECTROPHOTOMETER PLATFORM

(71) Applicant: ATOPTIX, Inc., State College, PA (US)

(72) Inventors: Perry S. Edwards, State College, PA (US); Zhiwen Liu, State College, PA (US); Victor Bucklew, Colorado Springs, CO (US); Baigang Zhang, San Jose, CA (US)

(73) Assignee: ATOPIX, INC., State College, PA (US)

( * ) Notice: Subject to any disclaimer, the term of this patent is extended or adjusted under 35 U.S.C. 154(b) by 0 days.

(21) Appl. No.: 16/342,884

(22) PCT Filed: Oct. 18, 2017

(86) PCT No.: PCT/US2017/057194
§ 371 (c)(1),
(2) Date: Apr. 17, 2019

(87) PCT Pub. No.: WO2018/075643
PCT Pub. Date: Apr. 26, 2018

(65) Prior Publication Data
US 2019/0250035 A1 Aug. 15, 2019

Related U.S. Application Data

(60) Provisional application No. 62/409,713, filed on Oct. 18, 2016.

(51) Int. Cl.
G01J 3/28 (2006.01)
G01J 3/02 (2006.01)
(Continued)

(52) U.S. Cl.
CPC ............ *G01J 3/0297* (2013.01); *G01J 3/0218* (2013.01); *G01J 3/0256* (2013.01); *G01J 3/42* (2013.01); *G01N 21/64* (2013.01)

(58) Field of Classification Search
CPC ........ G01N 21/27; G01N 21/31; G01N 33/49; G01N 21/64; G01N 21/65; G01J 3/42; G01J 3/02; G01J 3/44; G01J 3/26; G01J 3/28
See application file for complete search history.

(56) References Cited

U.S. PATENT DOCUMENTS 5,223,715 A * 6/1993 Taylor .................. G01N 21/255
250/339.02
6,343,227 B1 1/2002 Crowley
(Continued)

FOREIGN PATENT DOCUMENTS

WO 2016063284 A2 4/2016

OTHER PUBLICATIONS

Arafat Hossain M.D., et al. Combined "dual" absorption and fluorescence smartphone spectrometers: Optics Letter, vol. 40(8); pp. 1737, 40 doi 10.1364/OL.40.001737, Apr. 15, 2015.
(Continued)

*Primary Examiner* — Abdullahi Nur
(74) *Attorney, Agent, or Firm* — McNees Wallace & Nurick LLC

(57) ABSTRACT

A self-referencing mobile-compatible spectrophotometric system, including at least one light source, at least one spectral detection unit, and at least one reference sample. The system is configured to apply light from the at least one light source to a sample and receive a reflected light from the sample, and apply light to the at least one reference sample, and receive a reference reflected light from the at least one reference sample.

21 Claims, 2 Drawing Sheets

(51) Int. Cl.
*G01J 3/42* (2006.01)
*G01N 21/64* (2006.01)

(56) References Cited

U.S. PATENT DOCUMENTS

| | | | |
|---|---|---|---|
| 8,189,196 | B2 | 5/2012 | Belz |
| 8,345,226 | B2 | 1/2013 | Zhang |
| 8,797,529 | B2 | 8/2014 | Demmer et al. |
| 9,442,064 | B1 | 9/2016 | Thomas et al. |
| 9,706,927 | B2 | 7/2017 | Edwards et al. |
| 2008/0078544 | A1 | 4/2008 | Christian |
| 2012/0223130 | A1* | 9/2012 | Knopp ............... G01N 21/3586 235/375 |
| 2013/0162990 | A1* | 6/2013 | Kobayashi ............. G01J 3/021 356/301 |
| 2013/0265566 | A1* | 10/2013 | Smith ...................... G01J 3/28 356/39 |
| 2015/0189714 | A1 | 7/2015 | Fathalla et al. |

OTHER PUBLICATIONS

Chenji Zhang, et al. G-Fresnel smartphone spectrometer, Royal Society of Chemistry—Lab on a Chip, vol. 16, pp. 246-250, DOI: 10.1039/c5lc01226k, Jun. 1, 2016.

Elise K. Grasse, et al. Teaching UV-Vis Spectroscopy with a 3D-Printable Smartphone Spectrophotometer, Journal of Chemical Education,vol. 93, pp. 146-151: DOI: 10.1021/acs.jchemed.5.b00654, Nov. 12, 2015.

Chuan Yang, et al., Demonstration of a PDMS based hybrid grating and Fresnel lens ((G-Fresnel) device, Optics Express, vol. 18(23), pp. 23529-23534 Nov. 8, 2010.

R. W. Frei, "Diffuse Reflectance Spectroscopy; Applications, Standards, and Calibration (With Special Reference to Chromatography)", Journal of Research of the National Bureau of Standards—A. Physics and Chemistry, Vo. 80A, No. 4, Jul.-Aug. 1976.

Matt J. Aitkenhead, Graham J. Gaskin, Noemie Lafouge and Cathy Hawes, "Phylis: A Low-Cost Portable Visible Range Spectrometer for Soil and Plants", Sensors, 2017, 17, 99; doi: 10.3390/s17010099.

Shao-We Wang, Changsheng Xia, Xiaoshuang Chen, and Wei Lu, "Concept of a high-resolution miniature spectrometer using an integrated filter array", Optics Letters, Vo. 32, No. 6, Mar. 15, 2007.

Arafat Hossain M.D., et al. Combined "dual" absorption and fluorescence smartphone spectrometers:, Optics Letter, vol. 40(8); pp. 1737, 40 doi 10.1364/OL.40.001737, Apr. 15, 2015 (Abstract Only).

* cited by examiner

US 10,718,665 B2

SELF-REFERENCING MOBILE-COMPATIBLE SPECTROPHOTOMETER PLATFORM

FIELD OF THE INVENTION

The present invention is directed to the construction of instrumentation for the diagnosis of plant and human health, and more specifically to the introduction of a hand held, smart phone compatible, self-calibrated optical instrument and platform of detection.

BACKGROUND OF THE INVENTION

For plant health, this invention provides a system for early detection of crop diseases, nutrient concentrations, and water stress, ensuring the overall health of a plant. For human health, this invention provides a system for monitoring and diagnosing a number of conditions, including but not limited to reporting hemoglobin and glucose concentration levels.

Utilizing optical methodologies for the diagnosis of plant health has historically been very successful. These methodologies can largely be divided into point and swath measurements. For swath measurements, aerial or ground based image analysis and hyper spectral imaging are predominant. For point measurements, standard spectral reflectance, diffuse spectral reflectance, polarization rotation, absorption, fluorescence, and spontaneous Raman scattering have been successfully demonstrated in academic or laboratory settings.

However, when transitioning these methodologies into the field for research or commercial use, generally the embodiment of the instrumentation must be revised. For example, for optical point measurements, which this invention is directed towards, the affordability, size, and usability of the instrument are critical. Usually, miniaturization and standardization of equipment protocols are needed. However, due to the sophistication of laboratory equipment, such a transition is often difficult. In the cases when an instrument can be successfully made compact and easy to use by non-specialists, the original performance of the instrument that enables the methodology to be so successful in a laboratory setting, is oftentimes compromised. As a result, instrumentation designed for testing or diagnosis in the field, rarely is comparable in capabilities to the laboratory grade instrumentation that it was based upon.

Certain measures of plant health made in a field setting require the specifications that laboratory grade instrument provides, but must also be compact, affordable, and usable in a field setting in order to be of practical use. The present invention is directed towards such applications. More specifically, the present invention is directed towards a platform for optical detection that enables quantitative nutrient diagnosis, quantitative water stress analysis, early stage disease detection, disease differentiation, and health condition evaluation through design of a miniature self-referencing spectrophotometer.

BRIEF DESCRIPTION OF THE INVENTION

In an embodiment, a self-referencing spectrophotometric system, including at least one light source, at least one spectral detection unit, and at least one reference module.

In another embodiment, a method of operating a self-referencing spectrophotometric system, the system including; at least one light source, at least one spectral detection unit, and at least one reference sample. The method includes illuminating a sample with light from the at least one light source, and receiving reflected light from the sample by the at least one spectral detection unit. The method further includes determining the presence of at least one material based on the measured spectra.

In another embodiment, a health diagnosis process including, positioning a self-referencing spectrophotometric system, the system including; at least one light source, at least one spectral detection unit, at least one reference sample, and a sample. The process further includes applying light from the at least one light source to the sample. The process further includes applying light from the at least one light source to the at least one reference sample. The process further includes receiving reflected light from the at least one reference sample by the at least one spectral detection unit. The process further includes receiving reflected light from the sample by the at least one spectral detection unit.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a self-referencing mobile-compatible spectrophotometer. Embodiments of the present disclosure, for example, in comparison to concepts failing to include one or more features disclosed herein, provide for a compact, mobile-compatible, self-referencing spectrophotometer.

Figure 1:
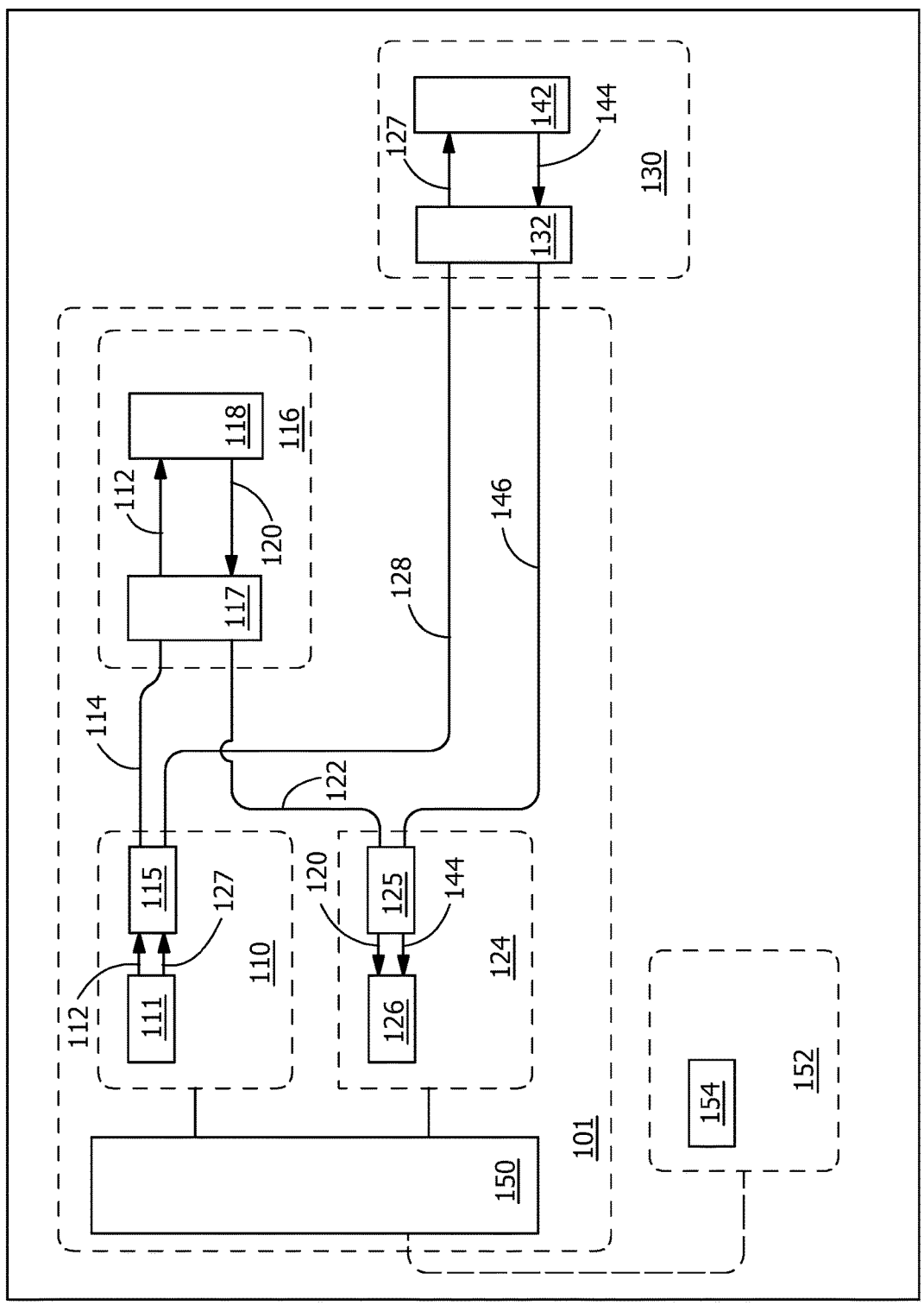
FIG. 1 is a block diagram of a spectrophotometric system, according to an embodiment.

FIG. 1 is an embodiment of a spectrophotometric system 100. The spectrophotometric system 100 includes a spectrophotometer 101 having an illumination unit 110. The illumination unit 110 includes at least one light source 111 (e.g., broadband light source, light emitting diode, incandescent lamp, halogen lamp, micro-halogen lamp, laser, phosphorescence light source, fluorescence light source, and combinations thereof). The light generated by the at least one light source 111 may include ultraviolet light, visible light, and/or near infra-red light as desired by a user. The illumination unit 110 provides a reference light 112 which is coupled into a first reference fiber 114 (e.g., optical fiber bundle) at an illumination port 115. In some embodiments, the illumination port 115 includes entrance ports to an array of optical fibers. The first reference fiber 114 directs the reference light 112 to at least one reference module 116. The reference light 112 exits the first reference fiber 114 at reference port 117 and at least a portion of the reference light 112 is incident on a reference sample 118 (e.g., Spectralon® reflectance material, Teflon™ material, nanoparticle/microparticle assembly, or any other suitable material which provides a broadband reflectance spectrum). In some embodiments, the reference sample 118 diffuses light uniformly across the spectrum (e.g., a broadband Lambertian reflectance surface). In some embodiments, the first reference fiber 114 may include a multi-mode fiber.

The reference light 112 incident on the reference sample 118 may be partially absorbed by the reference sample 118. A portion of the reference light 112 may be diffusely reflected by the reference sample 118. A portion of this reflected reference light 120 is coupled into a second reference fiber 122 as a reference signal. The second reference fiber 122 directs the reflected reference light 120 to a spectral detection unit 124. The reflected reference light 120 exits the second reference fiber 122 exit aperture at detection port 125 and at least a portion of the reflected reference light 120 is incident on at least one spectral detector 126 (e.g., filter arrays, spectrometers or spectrographs comprising two-dimensional pixilated camera, plurality of cameras, photodiode, photodetector, and combinations thereof).

In some embodiments, the first reference fiber 114 may spatially segregate the reference light 112 and reflected reference light 120. In some embodiments, a plurality of first reference fibers 114 may direct the reference light 112 to the reference module 116. In some embodiments, the first reference fiber 114 and the second reference fiber 122 may be arranged in a side-by-side configuration. In one embodiment, a single first reference fiber 114 may be arranged in a side-by-side configuration with a single second reference fiber 122. In some embodiments, the second reference fiber 122 may be surrounded by a plurality of first reference fibers 114. In one embodiment, the second reference fiber 122 may be surrounded by six first reference fibers 114.

Figure 2:
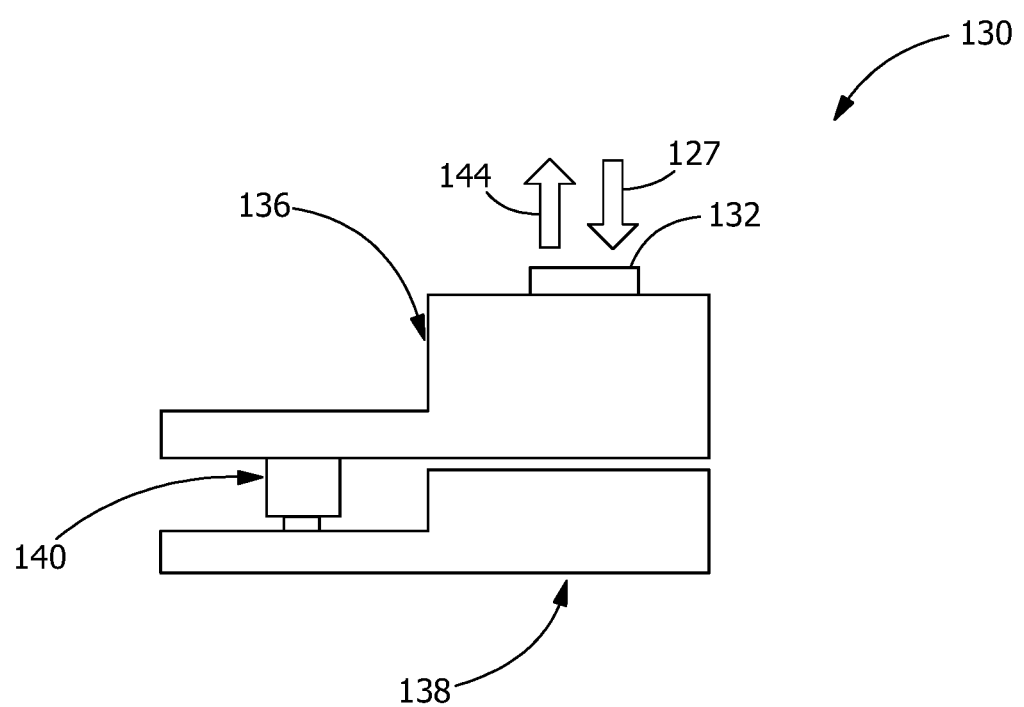
FIG. 2 is an expanded view of the sample holder of FIG. 1, according to an embodiment.

The illumination unit 110 additionally provides a sample light 127 which is coupled to a first sample fiber 128 (e.g., optical fiber bundle). The first sample fiber 128 directs the sample light 127 to a sample holder 130. An expanded view of the sample holder 130 is shown in FIG. 2 The sample holder 130 includes a sample port 132 through which the sample light 127 is configured to enter the sample holder 130. The sample holder 130 further includes a top sample holder section 136 which is pivotably attached to a bottom sample holder section 138 by a hinge 140. In some embodiments, at least one of the top sample holder section 136 or the bottom sample holder section 138 may be further configured to attach a sample to the sample holder section 136, 138. In some embodiments, the sample holder section 136, 138 may include a clip. In some embodiments, the sample holder 130 may be detachably attached to the spectrophotometer 101. In some embodiments, the sample holder 130 may be integral to the spectrophotometer 101. In some embodiments, the same illumination unit 110 provides both the sample light 127 and reference light 112.

The sample light 127 exits the first sample fiber 128 and enters the sample port 132. At least a portion of the sample light 127 is incident on a sample 142. In some embodiments, the sample 142 may be a substantially planar material. In some embodiments, the sample 142 may include microparticles or powders. In some embodiments, the sample 142 may include a polymer sheet or film. In some embodiments, the sample 142 may include a biological material, such as a plant material or skin (e.g., animal skin, human skin) sample. In some embodiments, the sample 142 may be attached to the sample holder section 136, 138 in a non-destructive or non-invasive manner. In some embodiments, the sample 142 may be attached to the sample holder section 136, 138 in a destructive or invasive manner. In some embodiments, the plant sample may include plant roots, stems, fruit, flower pedals, leaves, branches, bark, and combinations thereof.

The sample light 127 incident on the sample 142 may be partially absorbed by the sample 142. A portion of the sample light 127 may be diffusely reflected by the sample 142. A portion of this reflected sample light 144 is coupled into a second sample fiber 146 (e.g., optical fiber bundle) as a sample signal. In some embodiments, the second sample fiber 146 may be a fiber or a fiber bundle in the center of a ring of first sample fibers 128. In one embodiment, the second sample fiber 146 may be a fiber or a fiber bundle in the center of a ring of first sample fiber 128. In some embodiments, the fibers 114, 122, 128, 146 may include a multi-mode fiber.

In some embodiments, the first sample fiber 128 may spatially segregate the sample light 127 and reflected reference light 120. In some embodiments, a plurality of first sample fiber 128 may direct the sample light 127 to sample holder 130. In some embodiments, the first sample fiber 128 and the second sample fiber 146 may be arranged in a side-by-side configuration. In one embodiment, a single first sample fiber 128 may be arranged in a side-by-side configuration with a single second sample fiber 146. In some embodiments, the second sample fiber 146 may be surrounded by a plurality of first sample fibers 128. In one embodiment, the second sample fiber 146 may be surrounded by six first sample fibers 128.

The second sample fiber 146 directs the reflected sample light 144 to the spectral detection unit 124. The reflected sample light 144 exits the second sample fiber 146 exit aperture at detection port 125 and at least a portion of the reflected sample light 144 is incident on the at least one spectral detector 126. The spectral detection unit 124 may include components able to process the reflected reference light 120, 144. The reflected reference light 120, 144 may be spatially separated, collimated, and/or focused. The spectral detection unit 124 may also separate the reflected light 120, 144 by wavelength (e.g., spectrograph, spectrometer, G-Fresnel spectrometer, spectrophotometer, filter array). The processed reflected light 120, 144 may then be directed to one or more detectors in the spectral detector 126 (e.g., two-dimensional pixilated camera, plurality of cameras, photodiode, photodetector and combinations thereof). In some embodiments, the spectral detection unit may include a charge coupled device (CCD), or complementary metal-oxide-semiconductor (CMOS) device.

In some embodiments, the reflected reference light 120 and the reflected sample light 144 may be captured and/or processed simultaneously. Simultaneous processing enables the system to be self-referencing, allowing automatic calibration of a captured sample spectrum to the light source that originates it. Such a design frees an end user from having to calibrate the system 100. Thus, enabling a non-specialist end user to use the system 100 effectively. For example, the platform design enables the system 100 to automatically account for small changes in the camera and/or the illumination unit 110, providing the capability to greatly increase the consistency and sensitivity of the measurements without requiring a user to calibrate it before each measurement.

A communications unit 150 may be communicatively connected to the spectral detection unit 124, the illumination unit 110, and a control unit 152. The communication unit 150 may receive data from the one or more spectral detection units 124 and direct the data to the control unit 152. The communications unit 150 may additionally receive inputs from the control unit 152 (e.g., data, instructions, and combinations thereof) that regulate the operation of the spectrophotometer 101. Communication with the control unit 152 may be wired or wireless. In some embodiments, the communication is wirelessly performed over the internet. In some embodiments, the communication is wirelessly performed by Bluetooth connectivity. In some embodiments, the communication is performed via a wired network connection (e.g., Ethernet). In one embodiment, a wired connection may be established via an IOS, USB type C, or microUSB port. In some embodiments, the spectrophotometer 101 may further include a battery.

Various computing devices may be used as the control unit 152. Any computing device that is configurable to communicate with the spectrophotometer 101 may be used. Suitable computing devices include cell phones, tablet computers, laptop computers, desktop computers, mainframe computers, smartwatches, and combinations thereof. The control unit 152 may be configured to receive input from and display data to a user.

The control unit 152 may additionally include an analysis module 154. The analysis module 154 may receive data from the spectrophotometer 101 and from the memory. In some embodiments, the analysis module 154 may determine whether a spectrum of light detected by the spectral detection unit 124 correlates to a spectrum stored in the memory. In some embodiments, the analysis module 154 may determine whether the detected spectrum correlates to a spectrum selected by a user.

The analysis module 154 may use a pre-determined or adaptive algorithm to process the detected light spectrum. The analysis module 154 may compare the reflected reference light 120 to the reflected sample light 144 to determine the spectrum of the reflected sample light 144. The analysis module 154 may additionally determine whether the spectrum of the reflected sample light 144 corresponds to a predetermined material. In some embodiments, the analysis module 154 may determine whether a spectrum indicates the presence of one or more plant health concerns, such as plant diseases (e.g., viruses, bacteria, mold, and/or fungus) on the surface or in the interior of a leaf or root. Various plants may be analyzed including citrus fruits, cassava crops, tomato, potato, coffee, cocoa, and/or corn. The diseases detected may further include foliar, dodder, and root diseases.

In some embodiments, the analysis module 154 may determine that the spectrum corresponds to one or more known plant diseases (e.g., huanglongbing citrus disease, citrus tristeza disease, citrus stubborn disease, brown streak disease, cassava mosaic disease, phythophthora (e.g., tomato, potato, and/or citrus), and/or cocoa swollen shoot virus). In some embodiments, the spectral analysis may identify a disease that is pre-symptomatic. In some embodiments, the spectral analysis may identify a disease that is symptomatic.

In some embodiments, the analysis module 154 may analyze the spectrum to determine whether a plant is nutritionally healthy and/or hydrated. For example, the spectrum from a leaf may be analyzed to determine the concentration of nutrients or micronutrients, such as nitrogen, phosphorus, potassium, and/or zinc, present in the leaf. In some embodiments, the analysis module 154 may analyze the spectrum to determine the water content of a leaf.

The analysis module 154 may additionally assist a user in determining the overall health of the plant, determining treatment options, and developing a treatment plan.

In some embodiments, the analysis module 154, may analyze a skin sample to determine the presence of at least one skin condition (e.g., skin cancer, eczema, glucose level, hemoglobin level).

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A self-referencing spectrophotometric system, comprising:
    a spectrophotometer further comprising;
        at least one light source;
        at least one spectral detection unit; and
        at least one reference sample;
    wherein the at least one light source both provides light to illuminate the at least one reference sample and provides light to illuminate at least one sample external to the spectrophotometer; and
    wherein both the light collected from the at least one reference sample and the light collected from the at least one sample are directed to different positions on the detection port of the at least one spectral detection unit;
    wherein the spectral detection unit includes a two-dimensional pixilated detector; and
    wherein the spectrum of the light collected from the at least one reference sample and the spectrum of the light collected from the at least one sample are detected simultaneously by the two-dimensional pixilated detector.

2. The system of claim 1, wherein the light source includes a light emitting diode, incandescent lamp, halogen lamp, a broadband light source, laser, phosphorescence light source, fluorescence light source, and combinations thereof.

3. The system of claim 1, wherein the spectral detection unit includes at least one of a spectrograph, spectrometer, or filter array.

4. The system of claim 1, wherein the spectral detection unit includes at least two two-dimensional pixilated detectors.

5. The system of claim 1, wherein the spectral detection unit is configured to capture a spectrum for a particular measurement, and simultaneously capture a reference spectrum.

6. The system of claim 1, wherein the system is configured to be communicatively connected to a cell phone, a tablet, a computer, or combinations thereof.

7. The system of claim 1, wherein the system further includes optical fibers configured to include an illumination port, a reference port, a sample port, and a detection port;
    wherein the system is configured to couple the light from the at least one light source into the illumination port, said illumination port includes the entrance apertures of a fiber or an array of optical fibers configured to illuminate the at least one sample at the sample port, and also includes another fiber or an array of fibers for coupling light from the at least one light source to illuminate the at least one reference sample located at the reference port; and
    wherein said detection port contains the exit apertures of the optical fibers for sample signal collection and reference signal collection; and wherein the optical fibers are configured to direct the said sample signal and said reference signal to the at least one spectral detection unit.

8. The system of claim 1, wherein:
the at least one sample is positioned using a sample holder; and
the sample holder is spaced apart from the spectrophotometer.

9. The system of claim 1, wherein the system is configured to:
direct a part of the light from the at least one light source using a light coupling module to illuminate the at least one reference sample;
receive reflected light from the at least one reference sample;
direct another part of the light from the at least one light source using the light coupling module to illuminate at least one sample; and
receive reflected light from the at least one sample.

10. The system of claim 9, wherein the light from the at least one reference sample and the light from the at least one sample are both received by the at least one spectral detection unit.

11. A method of operating a self-referencing spectrophotometric system, the system including: at least one light source, at least one spectral detection unit, and at least one reference sample, the method comprising:
directing light from the at least one light source to illuminate the at least one reference sample;
receiving reflected light from the at least one reference sample by the at least one spectral detection unit;
directing light from the at least one light source to illuminate at least one sample;
receiving reflected light from the at least one sample by the at least one spectral detection unit;
determining a health status of the at least one sample based on the reflected light from the at least one sample and the reflected light from the at least one reference sample;
wherein the health status includes a water stress status; a nutrient stress status; or a plant disease selected from the group consisting of huanglongbing citrus disease, citrus tristeza disease, citrus stubborn disease, brown streak disease, cassava mosaic disease, phythophthora, cocoa swollen shoot virus, and combinations thereof.

12. The method of claim 11, wherein the health status includes the plant disease selected from the group consisting of huanglongbing citrus disease, citrus tristeza disease, citrus stubborn disease, brown streak disease, cassava mosaic disease, phythophthora, cocoa swollen shoot virus, and combinations thereof.

13. The method of claim 11, wherein the health status includes the nutrient stress status.

14. The method of claim 13, wherein a nutrient for the nutrient stress status is selected from the group consisting of nitrogen, phosphorus, potassium, and zinc.

15. The method of claim 11, wherein the at least one sample includes biological tissue.

16. The method of claim 11, wherein the health status includes the water stress status.

17. A health diagnosis process using spectroscopy, the process comprising:
positioning a self-referencing spectrophotometric system, the system including at least one light source, at least one spectral detection unit, at least one reference sample, and a light coupling module;
coupling light from the at least one light source into a sample illumination pathway;
coupling light from the at least one light source into a reference sample illumination pathway;
applying, by the at least one light source via the sample illumination pathway, light to at least one sample;
applying, by the at least one light source via the reference sample illumination pathway, light to the at least one reference sample;
receiving, by the at least one spectral detection unit, reflected light from the at least one sample; and
receiving, by the at least one spectral detection unit, reflected light from the at least one reference sample;
directing both the reflected light collected from the at least one sample and the reflected light collected from the at least one sample to different positions on the detection port of the at least one spectral detection unit;
wherein the spectral detection unit includes a two-dimensional pixilated detector; and
wherein the spectrum of the reflected light collected from the at least one reference sample and the spectrum of the reflected light collected from the at least one sample are detected simultaneously by the two-dimensional pixilated detector.

18. The process of claim 17, wherein the at least one sample includes a plant material.

19. The process of claim 18, wherein the plant material includes at least one leaf, wherein a sample holder is configured to position the at least one leaf flush with the spectrophotometer system, and wherein the sample holder is configured to stably hold the at least one leaf during a spectral capture.

20. The diagnosis process of claim 17, further comprising analyzing the reflected light from the at least one sample and the reflected light from the at least one reference sample to determine the health status of the at least one sample.

21. The diagnosis process of claim 17, wherein the at least one sample includes biological tissue.

* * * * *